United States Patent [19]
Taniwa

[11] Patent Number: 5,220,554
[45] Date of Patent: Jun. 15, 1993

[54] REPRODUCED SIGNAL PROCESSING APPARATUS

[75] Inventor: Shigeyuki Taniwa, Yokohama, Japan

[73] Assignee: Canon Kabushiki Kaisha, Tokyo, Japan

[21] Appl. No.: 963,021

[22] Filed: Oct. 19, 1992

Related U.S. Application Data

[63] Continuation of Ser. No. 572,440, Aug. 27, 1990, abandoned.

[30] Foreign Application Priority Data

Aug. 30, 1989 [JP] Japan .................................. 1-221646
Oct. 6, 1989 [JP] Japan .................................. 1-261299

[51] Int. Cl.⁵ .............................................. G11B 7/00
[52] U.S. Cl. ..................................... 369/124; 396/107; 360/39
[58] Field of Search .................... 369/124, 107; 360/39

[56] References Cited

U.S. PATENT DOCUMENTS 4,961,182  10/1990  Saito et al. ........................... 369/124

FOREIGN PATENT DOCUMENTS

59-167812  9/1984  Japan ..................................... 360/39

Primary Examiner—Jack I. Berman
Attorney, Agent, or Firm—Fitzpatrick, Cella, Harper & Scinto

[57] ABSTRACT

A reproduced signal processing apparatus for optically reproducing and demodulating modulated data recorded on an optical information recording media, comprises means for integrating the optically reproduced signal for each predetermined section, comparing the integrations of adjacent sections and amplifying or attenuating a portion of the unintegrated reproduced signal corresponding to the predetermined section in accordance with the comparison result.

16 Claims, 7 Drawing Sheets

REPRODUCED SIGNAL PROCESSING APPARATUS

This application is a continuation of prior application, Ser. No. 07/572,440 filed Aug. 27, 1990, now abandoned.

BACKGROUND OF THE INVENTION

1. Field of the Invention

The present invention relates to an information recording and reproducing apparatus which uses a magneto-optical disk, and more particularly to a reproduced signal processing apparatus which converts an analog signal reproduced from stored information to a digital signal.

2. Related Background Art

A magneto-optical disk has been recently known as a large capacity and erasable and rewritable optical disk.

In such a magneto-optical disk, an orientation of magnetization is changed in accordance with information data by using a vertically magnetized film as a recording media in which the magnetization is oriented vertically to a disk plane so that binary information is recorded. A specific principle of recording and reproducing is described below.

The recording medium has a coercive force at room temperature so that the direction of magnetization is not changed. However, when a laser beam is irradiated to the recording medium, a temperature at the irradiated area suddenly rises, and when it reaches a Curie point, the coercive force decreases. Under this condition, if a weak magnetic field of the opposite polarity to the direction of the initialized magnetization of the recording medium is externally applied, the magnetization at that area is reversed. In this manner, data is written. The data is reproduced by irradiating a laser beam to the disk and detecting a change of polarized plane (Kerr effect) of a reflected light.

When data is to be recorded on such a magneto-optical disk, the data is normally recorded after the data has been converted to a modulated code which highly matches a characteristic of the recording and reproducing system. Either 4/15 modulation or 4/11 modulation has been proposed as the modulation system therefor. In the 4/15 modulation, an 8-bit data word is converted to a 15-bit channel word, and four positions of a 15-position pattern are set to "1". The "1" bits are assigned to two of odd-numbered positions and two of even-numbered positions, of the 15 positions.

Accordingly, when the channel word is to be demodulated to the data word, the channel word may be separated to odd-numbered bits and even-numbered bits. In the 4/11 modulation, an 8-bit data word is converted to an 11-bit channel word. Four positions of an 11-position bit pattern are set to "1". However, unlike the 4/15 modulation, 1 bits are not assigned to the odd-numbered and even-numbered bits.

Figure 1:
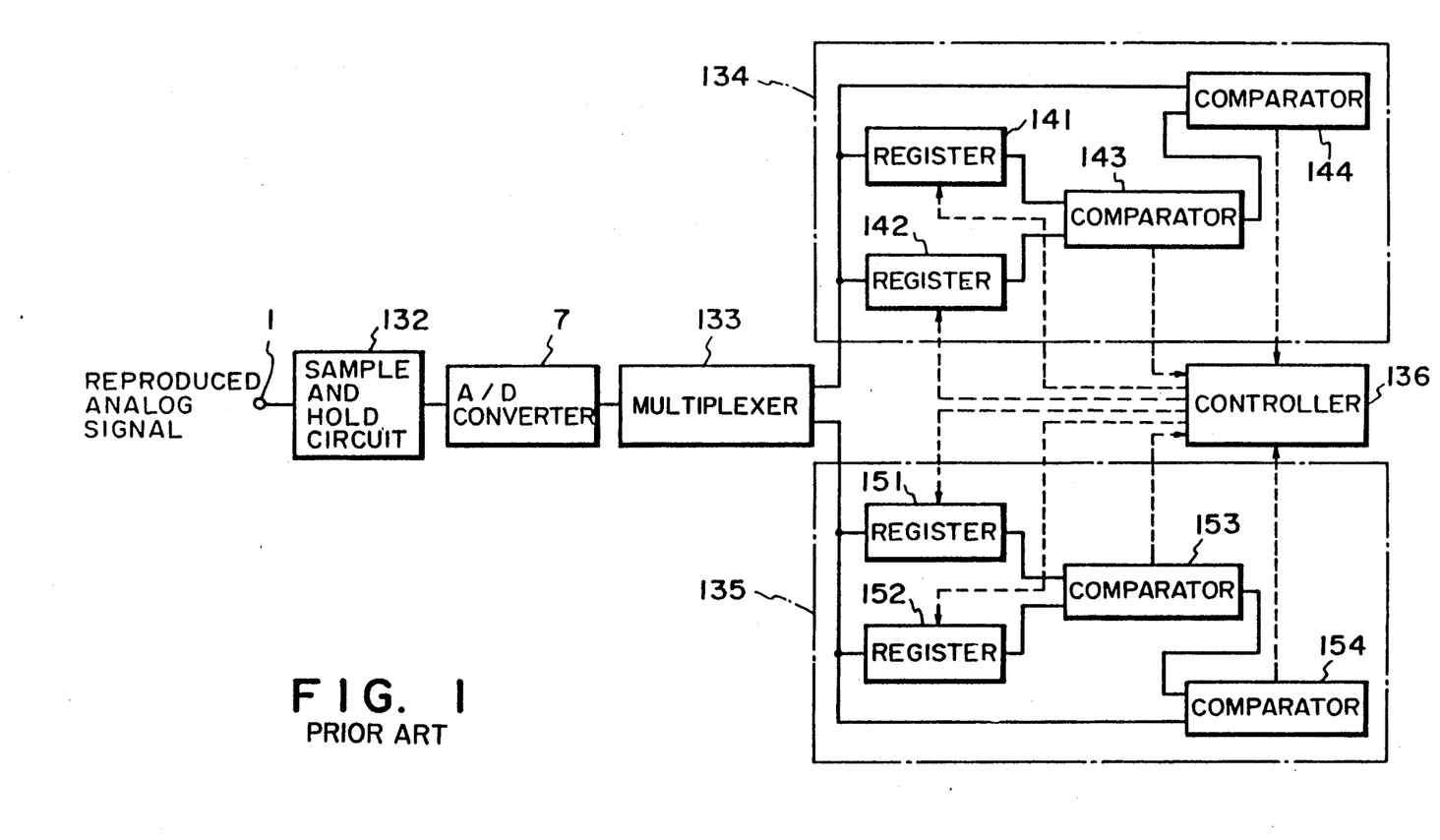
FIG. 1 shows a prior art differential detection apparatus.

The data recorded by the 4/15 or 4/11 modulation is usually reproduced by a differential detection system. FIG. 1 shows a block diagram of prior art differential detection means for the 4/15 modulated data.

In FIG. 1, a reproduced analog signal is applied at 1. The reproduced analog signal is sampled and held by a clock (not shown) for each data corresponding to one bit, by a sample and hold circuit 132, and it is converted to a digital signal by an A/D converter 7. The reproduced signal converted to the digital signal is supplied to a multiplexer 133 and then it is supplied to a comparator 134 or 135 depending on whether it is an even-numbered bit or an odd-numbered bit of a channel word.

The comparators 134 and 135 process in the same manner. Accordingly, the operation of only the comparator 134 is explained below. The comparator 134 sequentially stores the digitized reproduced signal into registers 141 and 142. Position numbers which indicate the bit positions of the reproduced signal, supplied from a counter (not shown) are also stored. When a third reproduced signal is supplied from the multiplexer 133 after the first two reproduced signals have been sequentially stored in the registers 141 and 142, the contents of the registers 141 and 142 are compared by a comparator 143 and a smaller one is outputted. It is compared with the third reproduced signal by a comparator 144. If the third input signal is larger, the content of one of the registers 141 and 142 which stores a smaller value is replaced by the input signal, and a position number which indicates a bit position of the input signal, supplied from a counter (not shown) is also stored.

If the output of the comparator 143 is larger, the third input is ignored. For fourth and subsequent reproduced signals, the comparison and storing are made in the same process. In this manner, when the 15 bits of one data word have been processed by the comparators 134 and 135, the contents of the registers 141, 142, 151 and 152 and the bit position data are transferred to a demodulator (not shown) where they are demodulated to the original data word.

The two largest signals each corresponding to the even-numbered address and the odd-numbered address in the data word of the sampled reproduced signal are sequentially extracted and the extracted reproduced signals are assigned to the "1" bits in the 15 bits. In the 4/11 modulation, the differential detection means does not process the signal by separating the even-numbered bits and the odd-numbered bit of the channel word, but the basic principle that the two largest signals of the sampled reproduced signal are sequentially extracted and the extracted reproduced signals are assigned to the "1" bits, is the same. However, in the above prior art differential detection system, a bit of the channel word which should be detected as "0" may be misdetected as "1" because of affect of waveform interference as shown in FIG. 2.

Figure 2:
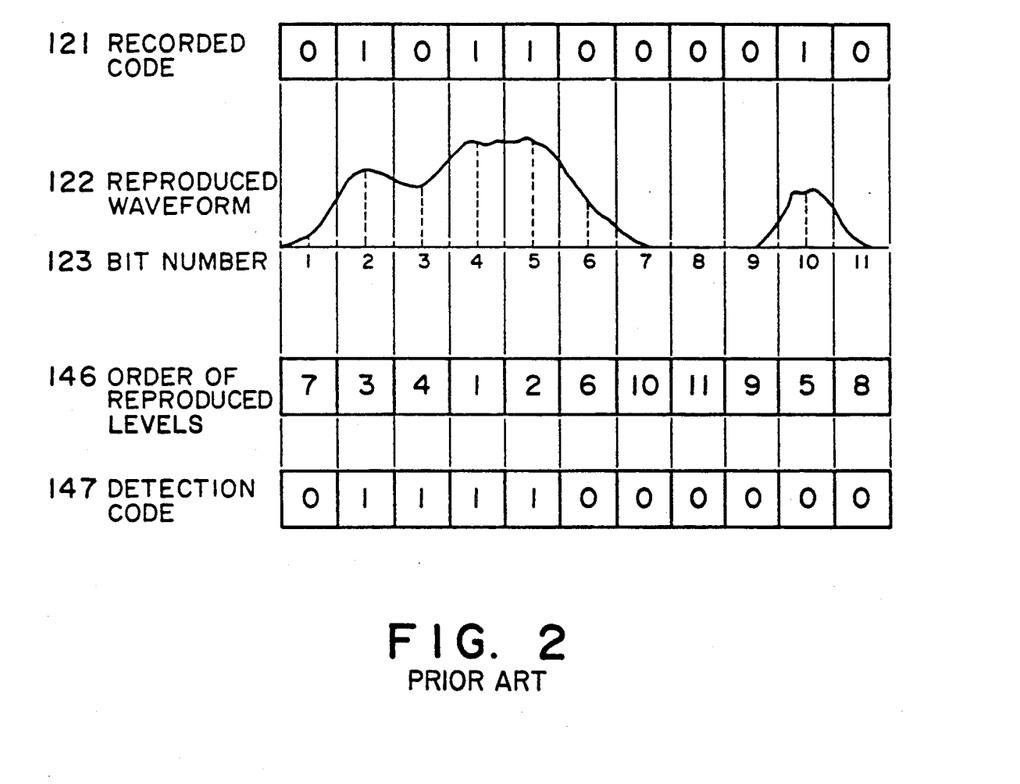
FIG. 2 illustrates misdetection of a detected data code due to waveform interference of a reproduced signal in the prior art differential detection apparatus.

In FIG. 2, numeral 121 denotes a recorded data code (channel word), and numeral 122 denotes a reproduced analog waveform reproduced from the recorded code 121. When the reproduced analog waveform 122 is differentially detected, an order of the reproduced levels is that shown by 146. In this example, the third bit of bit No. 123 of the reproduced waveform 122 is detected as "1" while it should be "0". Accordingly, the detection code 147 is in error.

SUMMARY OF THE INVENTION

It is an object of the present invention to provide a signal detection apparatus which can demodulate data correctly even if a reproduced signal includes distortion.

The above object is achieved by a reproduced signal processing apparatus of the present invention which optically reproduces and demodulates modulated data recorded on an optical information recording medium, comprising means for integrating the optically reproduced signal for each predetermined section, comparing the integrated values of adjacent sections and amplifying or attenuating a portion of an unintegrated reproduced signal corresponding to the predetermined section in accordance with the comparison result.

It is further achieved by a reproduced signal processing apparatus of the present invention which optically reproduces and demodulates modulated data recorded on an optical information recording media, comprising means for secondarily differentiating a reproduced signal to produce a secondary differentiation coefficient, detecting a polarity of the secondary differentiation coefficient and superimposing an offset signal to the reproduced signal in accordance with the detection result.

Details will be described in connection with the embodiments.

DESCRIPTION OF THE PREFERRED EMBODIMENTS

Figure 3:
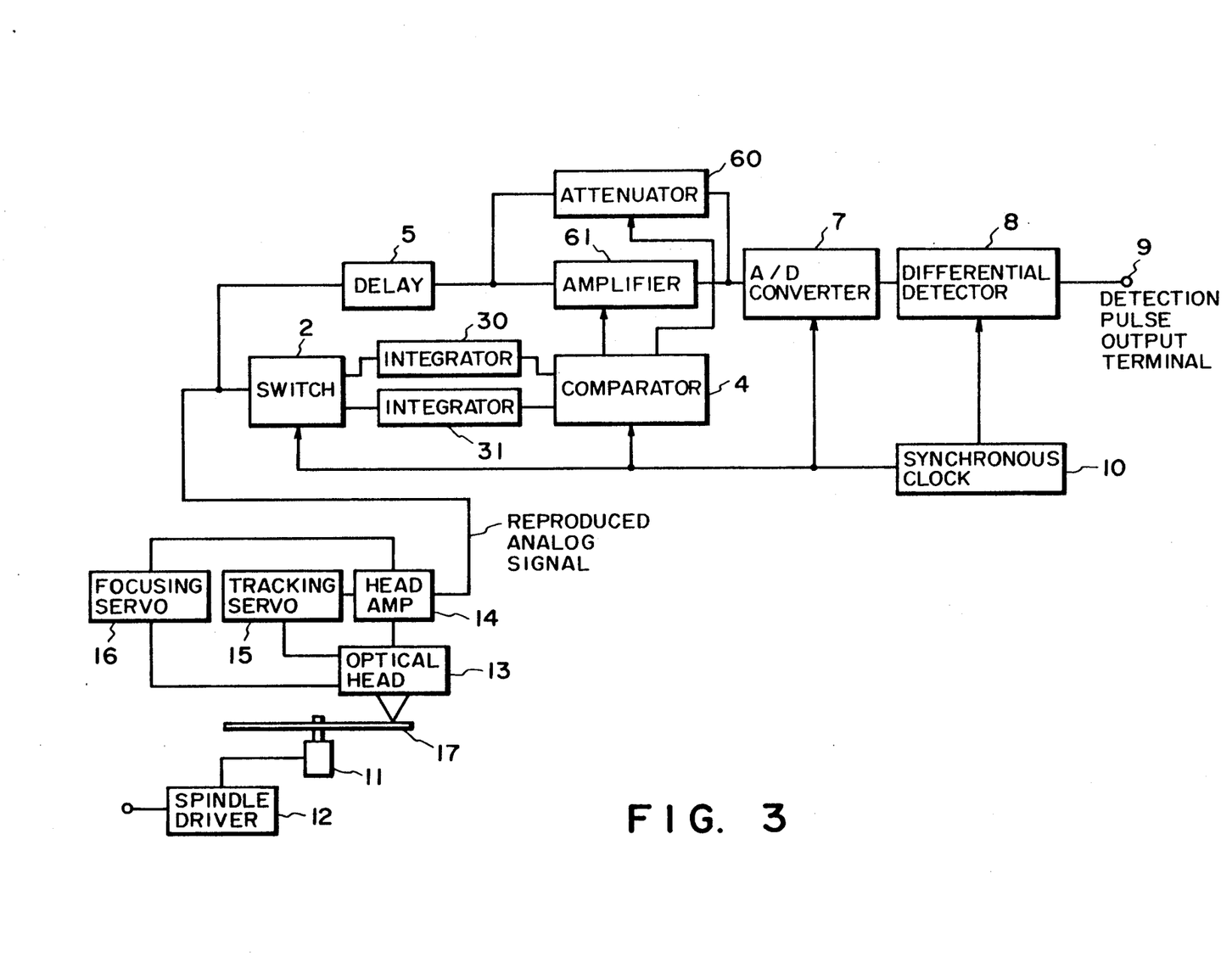
FIG. 3 shows a block diagram of a reproduced signal processing apparatus in accordance with a first embodiment of the present invention.

FIG. 3 shows a block diagram of the present invention.

In FIG. 3, reference numeral 17 denotes an optical information recording medium such as a magneto-optical disk, numeral 11 denotes a spindle for rotating the medium relative to an optical head, numeral 12 denotes a spindle driver for driving the spindle, numeral 13 denotes an optical head for optically detecting and recording information on the medium or optically detecting and reproducing information recorded on the medium, numeral 14 denotes a head amplifier for translating detected light from the medium 17 detected by the optical head 13 to an electrical signal, numeral 15 denotes a tracking servo for causing the optical head to follow a track on the medium, numeral 16 denotes a focusing servo for focusing the optical head onto the plane of the medium, numeral 2 denotes a switch for switching inputting of the reproduced analog signal derived from the optical head 13 and the head amplifier 14, to an integrator 30 or 31 at a predetermined timing, numerals 30 and 31 denote integrators for integrating the reproduced analog signal for each clock period, numeral 4 denotes a comparator for comparing the outputs of the two integrators 30 and 31, numeral 5 denotes a delay element for delaying the reproduced analog signal by a two-clock period, numeral 60 denotes an attenuator for attenuating the reproduced analog signal delayed by the delay element 5 at a predetermined attenuation rate, numeral 61 denotes an amplifier for amplifying the reproduced analog signal delayed by the delay element 5 at a predetermined amplification rate, numeral 7 denotes an A/D converter for converting the reproduced analog signal to a digital signal, numeral 8 denotes a differential detector for differentially detecting the reproduced signal converted to the digital signal by the A/D converter 7, numeral 9 denotes a detection pulse produced by the differential detector 8, and numeral 10 denotes a synchronous clock generator for generating a synchronous clock to synchronize the blocks.

Figure 4:
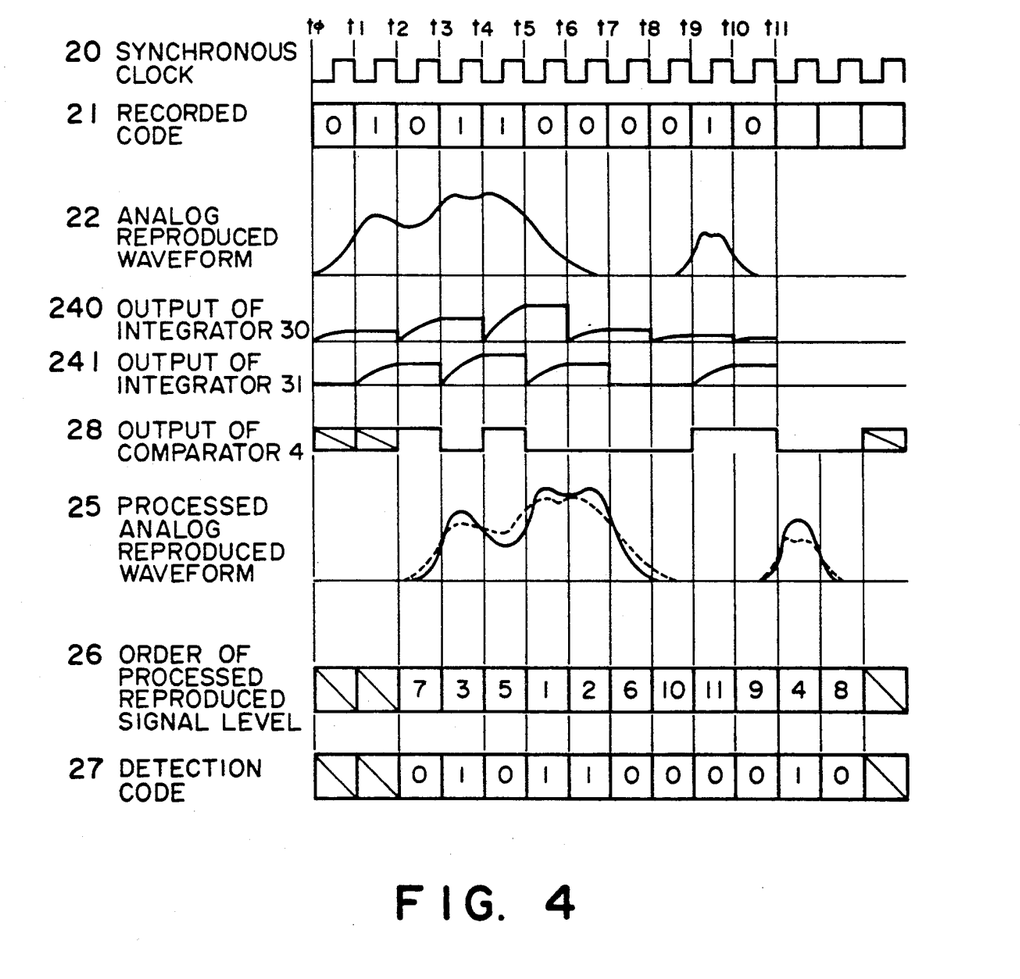
FIG. 4 shows a timing chart of the block diagram shown in FIG. 3.

FIG. 4 shows a timing chart of the block diagram of the present invention.

In FIG. 4, numeral 20 denotes a synchronous clock produced based on the reproduced analog signal, generated by the synchronous clock generator 10, tn (n=0—11) denotes a time defined by the synchronous clock 20, numeral 21 denotes a modulation-encoded data code (channel word; in the present embodiment, one data word comprises 11 bits) recorded on an optical disk (not shown), numeral 22 denotes a reproduced waveform of the reproduced analog signal derived from the optical head and the head amplifier corresponding to the data code 21, numeral 240 denotes an output waveform of the integrator 30, numeral 241 denotes an output waveform of the integrator 31, numeral 28 denotes a comparator output indicating the result of composition of the integration of the integrators 30 and 31 by the comparator 4, numeral 25 denotes an analog reproduced waveform applied to the A/D converter 7, after the processing by the attenuator 60 and the amplifier 61, numeral 26 denotes an order of levels of the reproduced waveform produced by differentially detecting by the differential detector 8 the digital signal converted from the analog signal of the processed reproduced waveform 25 by the A/D converter 7, and numeral 27 denotes a detection code indicating the value of the detection pulse produced at the detection pulse output terminal 9 of the differential detector 8.

The operations of the units of the block diagrams of FIG. 3 are now explained with reference to the timing chart of FIG. 4.

It is assumed that the reproduced analog signal derived from the optical head (not shown) and the head amplifier has a waveform as shown by the reproduced waveform 22 in FIG. 4.

The reproduced analog signal is supplied to the integrator 30 and the delay element 5 through the switch 2 for a period of time t0 to time t1. The switch 2 switches the inputs to the integrators 30 and 31 at every determined time based on the synchronous clock 20. The integrator 30 integrates the reproduced analog signal for the period t0-t1 and holds the integration until the next signal is supplied. The integrated waveform is shown by reference numeral 240 in FIG. 2. Then, for a period t1-t2, the reproduced analog signal is applied to the integrator 31 and the delay element 5 through the switch 2. The integrator 31 integrates the reproduced analog signal as the integrator 30 did. The integrated waveform is shown by reference numeral 241 in FIG. 4.

After the integration, the comparator 4 compares, at the time t2, the output of the integrator 30 for the reproduced signal for the period t0-t1 and the output of the integrator 31 for the reproduced signal for the period t1-t2. If the comparison shows that the integration of the later-applied reproduced analog signal is larger, the comparator produces a "high" level signal to the attenuator 60 and the amplifier 61, and if it is smaller, the comparator produces a "low" level signal. The attenuator 60 responds to the "high" level output signal from the comparator 4 and the amplifier 61 responds to the "low" level output signal. Accordingly, if the integration of the later-applied reproduced analog signal is larger, the attenuator 60 is activated to attenuate the reproduced analog signal applied through the delay element 5 at a predetermined attenuation rate. On the other hand, if the integration of the later-applied reproduced analog signal is smaller, the amplifier 61 is activated to amplify the reproduced analog signal supplied through the delay element 5 at a predetermined amplification rate. In the present example, since the output of the integrator 31 is larger, the attenuator 60 is activated so that the reproduced analog signal during the period t0–t1 supplied through the delay element 5 is attenuated at the predetermined attenuation rate into the one shown for the period t2–t3 of the processed analog reproduced waveform 25 (solid line) of FIG. 4. The amplification rate and the attenuation rate are set to a approximately 20–30%.

At the timing t2, the switch 2 is activated to supply the analog reproduced signal to the integrator 30 for the period t2–t3. The signal is integrated in the same manner as that described above, and the resulting output of the integrator 30 is compared, at time t3, with the output of the integrator 31 for the reproduced signal for the period t1–t2, which has been integrated and held. Depending on the magnitudes of the output signals, the attenuator or the amplifier is activated to process the reproduced analog signal, in the manner described above. In this manner, the processed analog reproduced signal is produced. The delay element is selected by taking account of the processing times of the integrators 30 and 31 and the comparator 4. In the present embodiment, the delay time corresponds to time (t2-t0).

The processed analog reproduced wave 25 is sequenced in a descending order of the signal level by the differential detector 8 in accordance with a differential detection method similar to a prior art one, to produce the processed reproduced waveform level order 26 shown in FIG. 4. In this order, the top four are set to "1" to produce the detection code 27 shown in FIG. 4.

In the present embodiment, the reproduced analog signal is processed on real time by using the delay element 5. Alternatively, the output of the comparator for all bits (one channel word) may be stored in a memory and they may be collectively processed later.

A second embodiment of the present invention is now explained.

Figure 5:
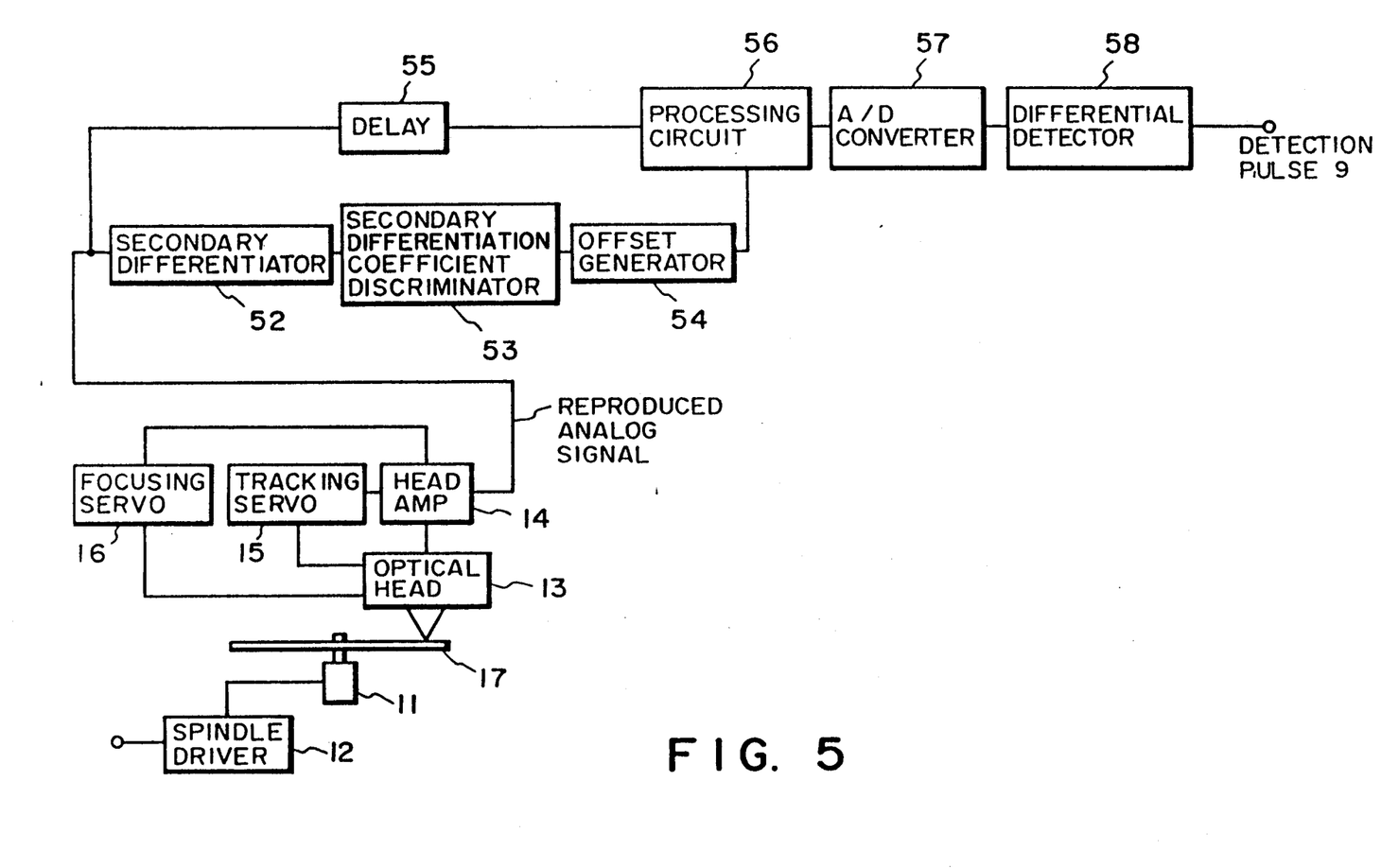
FIG. 5 shows a block diagram of a reproduced signal processing apparatus in accordance with a second embodiment of the present invention.

FIG. 5 is a block diagram of the second embodiment of the present invention.

In FIG. 5, like elements to those shown in the previous embodiment are designated by like numerals and the explanation thereof is omitted. Numeral 52 denotes a secondary differentiator, numeral 53 denotes a coefficient sign discriminator for the secondary differentiator 52, numeral 54 denotes an offset generator for generating an offset in accordance with the discrimination result of the secondary differentiation coefficient discriminator 53, numeral 55 denotes a delay unit such as a delay element for delaying the reproduced analog signal, numeral 56 denotes a processing circuit for processing the reproduced analog signal 51 by synchronously superimposing the reproduced analog signal 1 delayed by the delay unit 55 on the offset produced by the offset generator 54, numeral 57 denotes an A/D converter for converting the processed reproduced analog signal from the processing circuit 56 to a digital signal, numeral 58 denotes a differential detector for detecting a difference of outputs of the A/D converter 57, and numeral 59 denotes a detection pulse produced by the differential detector 58.

The operation of the second embodiment is now explained with reference to FIG. 6, too.

Figure 6:
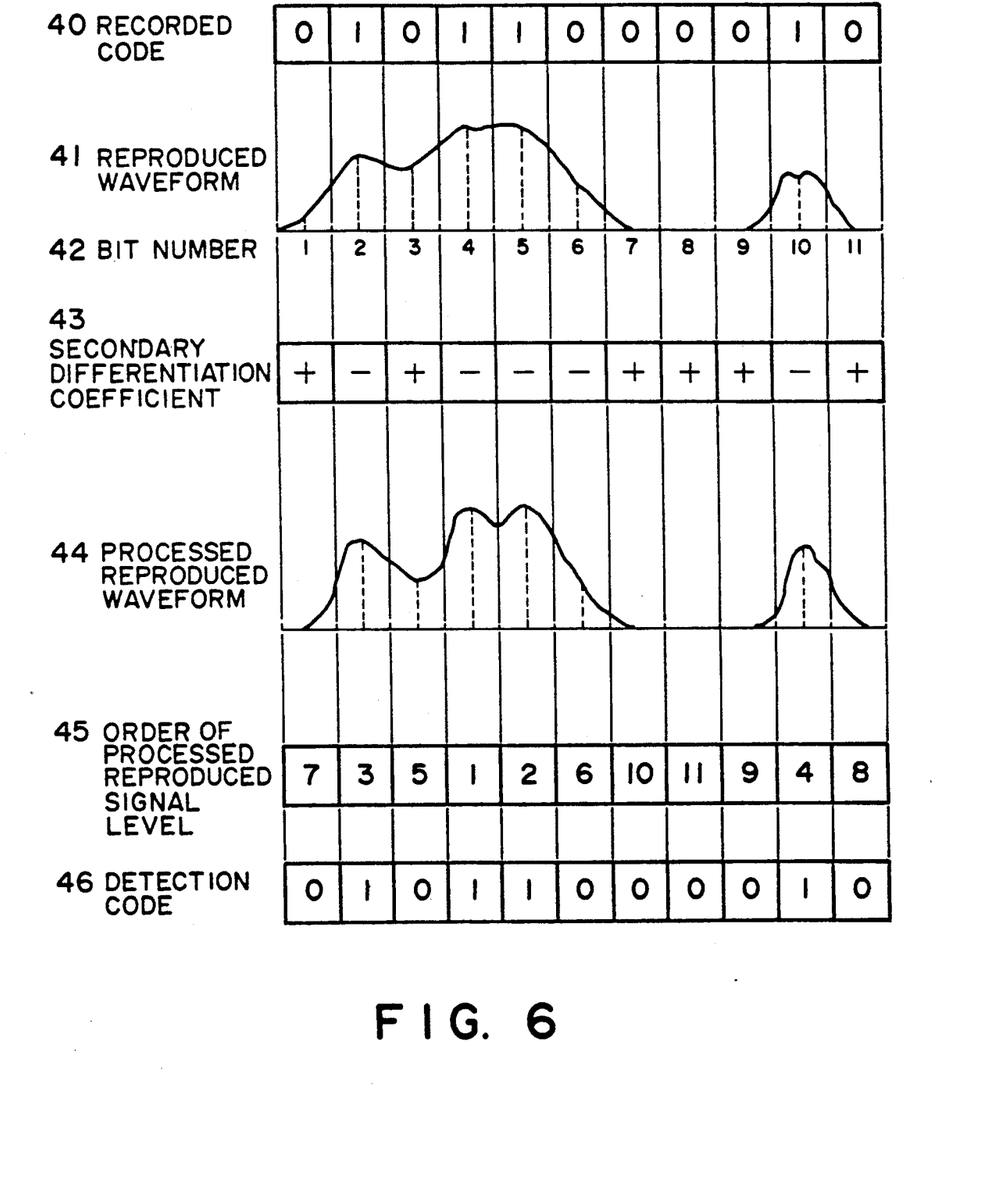
FIG. 6 shows a timing chart of the block diagram shown in FIG. 5.

In FIG. 6, numeral 40 denotes a code initially recorded. When the code 40 is reproduced, the waveform of the reproduced analog signal 1 is one shown by reference numeral 41 in FIG. 6.

The reproduced analog signal 1 is supplied to the secondary differentiator 52 where it is secondarily differentiated to produce the secondary differentiation coefficients. Then, the sign of the secondary differentiation coefficient is determined for each bit by the secondary differentiation coefficient discriminator 53 (43 in FIG. 6).

Then, based on the discrimination result, a predetermined offset is generated for each bit by the offset generator 54. The offset is superimposed on the reproduced analog signal 1 delayed by the delay element 55, by the processing circuit 56.

In the second embodiment, if the sign of the secondary differential coefficient is negative, a positive offset value is superimposed, and if the sign of the secondary differentiation coefficient is positive, a negative offset value is superimposed.

As a result, the processed reproduced analog waveform is corrected into one shown by 44 in FIG. 5. The processed reproduced waveform 44 is converted to a digital signal by the A/D converter 57 and it is then differentially detected by the differential detector 58.

As a result, the order of levels of the processed reproduced signal is one shown by 45 in FIG. 6 and the detection code is correctly detected as shown by 46 in FIG. 6.

Figure 7:
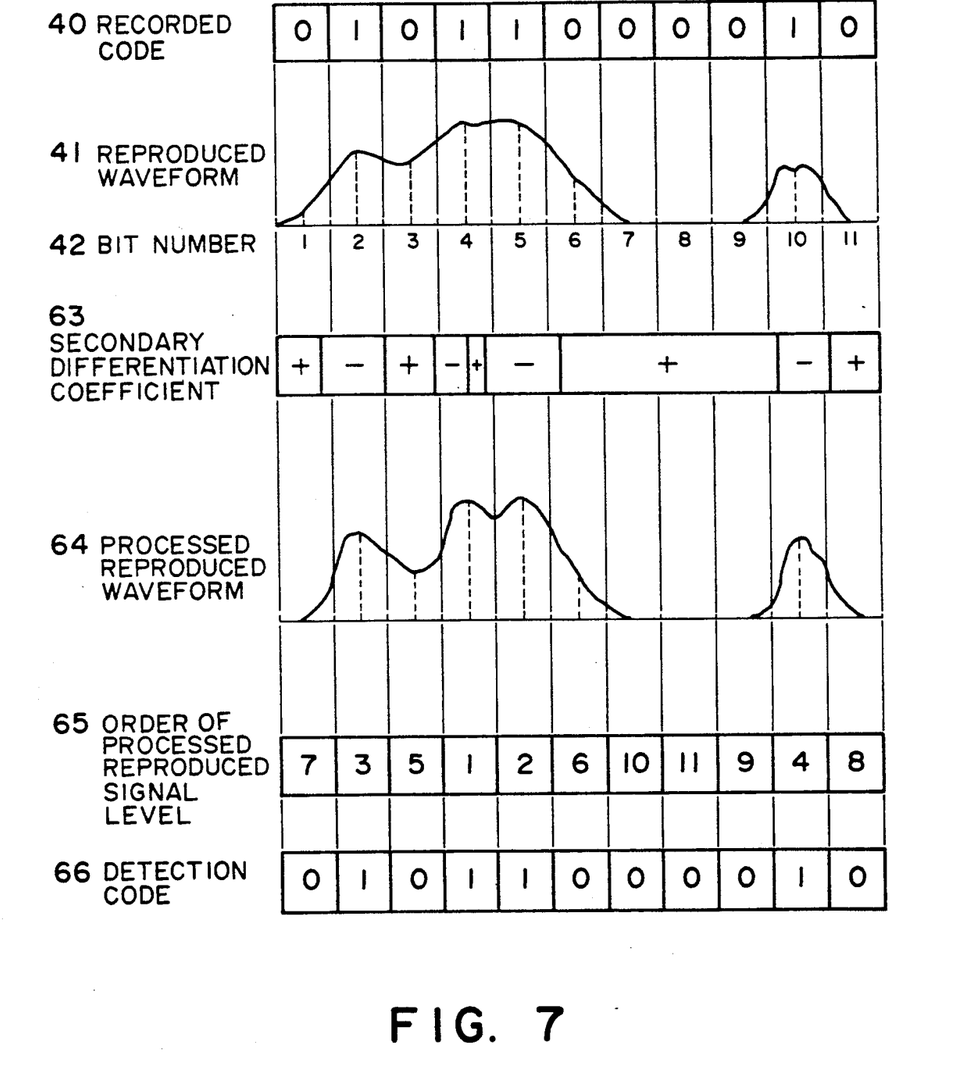
FIG. 7 shows a timing chart of a third embodiment of the present invention.

A third embodiment of the present invention is now explained. In the second embodiment, the secondary differentiation coefficient is derived for each bit of the channel word. In the third embodiment, the secondary differentiation coefficient is not derived for each bit but a sign is derived for each inflection point as shown by 63 in FIG. 7 to attain the same effect.

What is claimed is:

1. A reproduced signal processing apparatus for optically reproducing and demodulating modulated data recorded on an optical information recording media, comprising:

means for integrating each of a plurality of predetermined sections of an optically reproduced signal for each predetermined section, comparing the integrations of adjacent sections and amplifying or attenuating a portion of the unintegrated reproduced signal corresponding to the predetermined section in accordance with the comparison result.

2. A reproduced signal processing apparatus according to claim 1 wherein said recorded data is digital data and said predetermined section corresponds to one bit of the digital data.

3. A reproduced signal processing apparatus according to claim 1 wherein said optically reproduced signal is an analog signal.

4. A reproduced signal processing apparatus according to claim 1 wherein the comparison is made for one section and the adjacent and succeeding sections.

5. A reproduced signal processing apparatus according to claim 4 wherein when the integration for the succeeding section is larger, the portion of the unintegrated reproduced signal corresponding to said one section is attenuated.

6. A reproduced signal processing apparatus according to claim 5 wherein an attenuation rate is 20-30%.

7. A reproduced signal processing apparatus according to claim 4 wherein when the integration for the succeeding section is smaller, the portion of the unintegrated reproduced signal corresponding to said one section is amplified.

8. A reproduced signal processing apparatus according to claim 7 wherein an amplification rate is 20-30%.

9. A reproduced signal processing apparatus according to claim 1 further comprising a differential detector.

10. A reproduced signal processing apparatus for optically reproducing and demodulating modulated data recorded on an optical information recording medium, comprising:

means for secondarily differentiating an optically reproduced signal to produce a secondary differentiation coefficient, determining the sign of the secondary differentiation coefficient and superimposing an offset on an undifferentiated reproduced signal in accordance with the determination result.

11. A reproduced signal processing apparatus according to claim 10 wherein the data recorded on the medium is digital data.

12. A reproduced signal processing apparatus according to claim 10 wherein the optically reproduced signal is an analog signal.

13. A reproduced signal processing apparatus according to claim 11 wherein the determination is made for each bit of the digital data.

14. A reproduced signal processing apparatus according to claim 13 wherein when the sign of the secondary differentiation coefficient is positive, a predetermined offset is subtracted from the portion corresponding to the bit for which the determination for the reproduced signal prior to the secondary differentiation has been made.

15. A reproduced signal processing apparatus according to claim 13 wherein when the sign of the secondary differentiation coefficient is negative, a predetermined offset is added to the portion corresponding to the bit for which the determination for the reproduced signal prior to the secondary differentiation has been made.

16. A reproduced signal processing apparatus according to claim 10 further comprising a differential detector.

* * * * *

UNITED STATES PATENT AND TRADEMARK OFFICE
CERTIFICATE OF CORRECTION

PATENT NO. : 5,220,554
DATED : June 15, 1993
INVENTOR(S) : SHIGEYUKI TANIWA

It is certified that error appears in the above-indentified patent and that said Letters Patent is hereby corrected as shown below:

COLUMN 2:

```
Line 38, "bit" should read --bits--;
Line 45, "affect of" should be deleted; and
Line 52, "146." should read --reference numeral 146.--.
```

COLUMN 3:

```
Line 7, "media," should read --medium,--.
```

COLUMN 6:

```
Line 46, "media," should read --medium,--;
Line 50, "signal" should read --signal,--; and
Line 51, "for each predetermined section," should be
        deleted.
```

Signed and Sealed this

Third Day of May, 1994

Attest:

BRUCE LEHMAN

*Attesting Officer*   *Commissioner of Patents and Trademarks*